Patented Mar. 6, 1923.

1,447,615

UNITED STATES PATENT OFFICE.

FRED B. DALLAM, OF SAN FRANCISCO, CALIFORNIA.

MEANS FOR PRESERVING FOOD.

No Drawing. Application filed October 13, 1919. Serial No. 330,438

*To all whom it may concern:*

Be it known that I, FRED B. DALLAM, a citizen of the United States, residing at the city and county of San Francisco and State of California, have invented new and useful Improvements in Means for Preserving Food, of which the following is a specification.

This invention relates to a method and means for preserving food-stuff.

It is the principal object of the present invention to provide a method of preserving food-stuff, which is particularly adapted for use in connection with the packing and preservation of fruit, and which will insure that the fruit will be maintained in a fresh condition when packed and that in the event that the fruit is bruised, the protecting and preserving means will exert a drying action on bruises of fruit.

The present invention contemplates the use of wrapping paper, which has been specially chemically treated, and which, when it is used to wrap fruit or other food-stuff, will exclude bacteria while permitting a free circulation of air, and will at the same time supply certain chemicals which will act to dry up any bruises upon the fruit.

In carrying out the present invention, it is first necessary to make a paper, by what is commercially known as the slow process. Paper of this character is of very loose fibre and therefore provides a structure which might in a sense be termed a gauze, through which the air passing to the articles wrapped in the paper, may be ventilated. As will be understood by those skilled in the art, slow process paper is very soft and a microscopic examination of it would show that it is fibrous and to a great extent, porous. This is desirable in the present instance as it is intended that the articles wrapped in the fruit shall be supplied with a small amount of oxygen and that the atmosphere passing through the paper to the fruit will be disinfected. This disinfecting action is produced by chemicals with which the paper is impregnated. The chemicals are administered to the paper while it is yet in the pulp and before it has finally been formed in the sheet, or it may be desired to dip the paper in the chemical solution after the process of manufacture has been completed. The first-mentioned way, however, is the most preferable. In investigating the matter, it has been found that the paper should be treated with an astringent and also with a disinfectant. The astringent may be easily supplied as it is usually used in paper for producing a sizing action and is supplied as a part of the loading process. The paper may preferably be made by mixing resin with the pulp as well as soda ash and an excess of alum. The proportion of these chemicals are substantially the same as now used in the commercially produced paper, which are soda ash mixed with twelve times its weight of water, resin mixed in the proportion of six times the weight of the soda ash, and alum six to one part of resin. This will satisfactorily size and bleach the paper and at the same time will produce an astringent which will exert a drying action on fruit wrapped in the paper. In the pulp certain disinfecting agents are added such as cyanide, sulphur compound and mercurials. A principal treatment has been with bluestone and lime.

In the solution, equal parts of blue vitriol and lime are added, one pound of the combination being mixed with ten pounds of water, as previously specified in the solution of resin, alum and soda ash. When the pulp has been thoroughly mixed with these chemicals, it is formed into sheets and may thereafter be used to wrap the articles desired to be preserved. It will also be understood that this chemical solution might be added to the paper in the course of beating or that thereafter the finished paper may be dipped in the solution of blue vitriol and lime or any other desired disinfectant in order to obtain the result specified.

In carrying out the process of preservation, fruit or other food-stuff is wrapped in the paper treated as previously described and it will be understood that the paper may be either in sheets or forming containers. When the article of food is completely enclosed within the paper it may be placed in storage and the air passing around the paper will be permitted to have a limited circulation through the pores of the paper. Due to the fact that this is slow made paper, the thin fibers will be formed around all of the pores, and as these are impregnated with the disinfecting chemical, it will be seen that a sterilizing effect will be produced upon the circulating air. This will prevent deterioration of the fruit.

It will thus be seen that by the method of preservation here disclosed, fruits and other food-stuff may be easily kept in a desirable condition without decay and without the possibility of damage, due to bruising.

While I have shown the preferred form of my process and the means by which it may be attained, it will be understood that various changes in the method and means may be made by those skilled in the art, without departing from the spirit of the invention as claimed.

Having thus described my invention, what I claim and desire to secure by Letters Patent is—

A wrapper for fruit and the like, composed of a slow process gauze-like fibrous paper having apertures formed therein by the said process to permit the passage of air therethrough, said paper being impregnated with a disinfecting agent, whereby air passing through the paper will be disinfected prior to reaching the fruit or the like, the paper being also impregnated with an astringent to exert a drying action upon bruises or injuries to the fruit and presenting a soft fibrous surface to the same to subject the fruit to the maximum effect of both the disinfecting agent and the astringent.

In testimony whereof I have hereunto set my hand in the presence of two subscribing witnesses.

FRED B. DALLAM.

Witnesses:
W. W. HEALEY,
M. E. EWING.